United States Patent [19]

Cochran et al.

[11] 3,781,820

[45] Dec. 25, 1973

[54] PORTABLE ELECTRONIC CALCULATOR

[75] Inventors: David S. Cochran, Palo Alto; Thomas E. Osborne, San Francisco, both of Calif.

[73] Assignee: Hewlett-Packard Company, Palo Alto, Calif.

[22] Filed: May 30, 1972

[21] Appl. No.: 257,606

[52] U.S. Cl. .......... 340/172.5
[51] Int. Cl. .......... G06f 3/02
[58] Field of Search .......... 340/172.5

[56] References Cited

UNITED STATES PATENTS

| | | | |
|---|---|---|---|
| 3,328,763 | 6/1967 | Rathbun et al. | 340/172.5 |
| 3,641,329 | 2/1972 | De Sandre et al. | 340/172.5 |
| 3,553,445 | 1/1971 | Hernandez | 340/172.5 |
| 3,611,299 | 10/1971 | Lindsey et al. | 340/172.5 |
| 3,675,213 | 7/1972 | Spangler | 340/172.5 |

*Primary Examiner*—Paul J. Henon
*Assistant Examiner*—John P. Vandenburg
*Attorney*—Patrick J. Barrett

[57] ABSTRACT

An electronic calculator is provided with an enter key, a change sign and a store key. The enter key causes a stack memory to be pushed down, duplicating information from a keyboard register into a first memory register. The first data key actuated after the enter key causes the keyboard register to be cleared before the new data is entered into that register. The change sign key operates in conjunction with a keyboard register of the main stack memory to change the sign of a number contained therein. If this key is actuated subsequent to the performance of a function and data is entered after the key is actuated, then the sign of the new entry will be changed rather than the sign of the previous contents of the keyboard register. The store key causes information in the keyboard register to be duplicated into an auxiliary memory. The first data key actuated after the store key causes the keyboard register to be cleared before the new data is entered.

14 Claims, 5 Drawing Figures

PORTABLE ELECTRONIC CALCULATOR

BACKGROUND AND SUMMARY OF THE INVENTION

Calculators using delay line memories and serial data processing are well known in the art, as shown by U. S. Pat. No. 3,328,763 granted to H. M. Rathbun et al. (hereinafter referred to as Rathbun). Prior art calculators usually had a limited number of data manipulating keys and often a number of key strokes was necessary to achieve a desired manipulation. For example, in prior art machines the duplication of an entry required either reentry of the number or actuation of a separate repeat key after an enter key. Changing the sign of an entry often required a multistep operation involving subtraction of the entry from zero. Storing a number usually removed it from the stack memory and reentry or recall of the number was therefore necessary if one wanted to use the stored number immediately.

In the present invention, the actuation of the enter key pushes down the stack so that the keyboard and first memory register contain the same data. Thus, a repeat key is not necessary. If data keys are actuated after the enter key is actuated, the first data key will cause the keyboard register to be cleared before the new data is stored therein. A change sign (CHS) key is provided to permit changing the sign of the data in the keyboard register without performing a subtract operation. When the CHS key is actuated, the sign digit of the data in the keyboard register is complemented. If the CHS key is actuated after a function is performed and a data key is actuated after CHS, the original sign will be restored to the data in the keyboard register as the stack is pushed down. The sign will then be changed, made negative in this case, on the new data entered from the digit keys. The CHS key may also be actuated after data has been entered from the digit keys to change the sign of that entry. The store key in the present invention causes replication of information in the keyboard register into the auxiliary memory without destroying the information in the keyboard register. If a digit key is actuated after a store operation, the keyboard register will be cleared before the digit is entered into it.

DESCRIPTION OF THE PREFERRED EMBODIMENT

Figure 1:
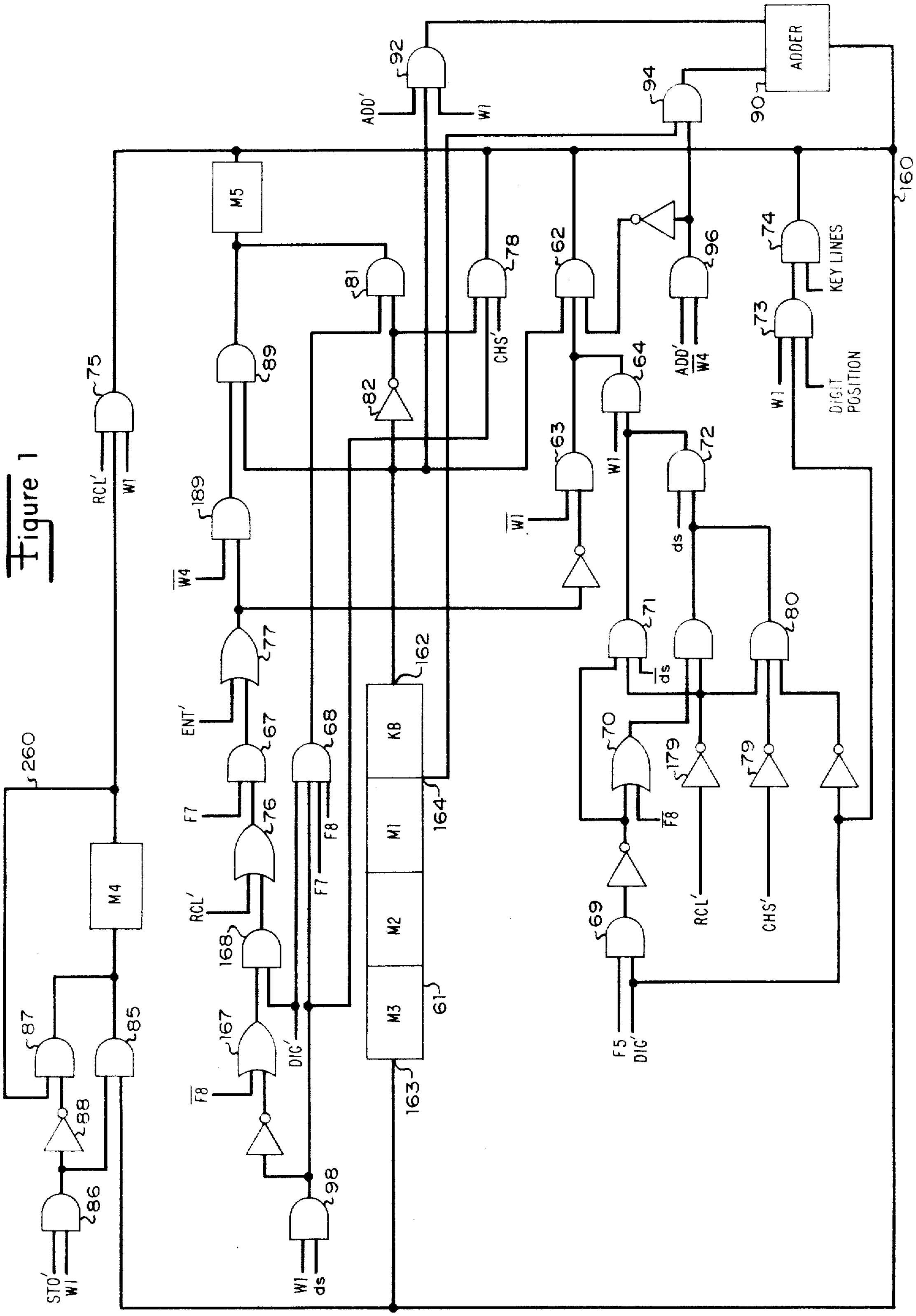
FIG. 1 shows the basic logic for a preferred embodiment of the present invention.

FIG. 1 shows a block diagram of the logic circuitry for a preferred embodiment of the present invention. A shift register type stack memory 61 having four storage registers or locations is used for primary information storage. This memory is essentially the same as that disclosed by Rathbun. The four storage locations are designated KB, M1, M2, and M3, where KB is the top stack location or register into which keyboard information is entered. The information in KB is also the information that is usually displayed to a calculator user. Since the stored data is constantly being circulated around a loop connecting the output 162 of memory 61 with the input 163, four word times are defined to correspond to the presence of the words in KB. M1, M2, and M3 at a given point in the date loop. The memory positions shown in FIG. 1 correspond to word time W1; for each subsequent word time the memory positions are shifted to the right, and the rightmost location becomes the left-most one. When no operations are being performed on the calculator, the normal data path is from output 162 through an AND gate 62 and line 160 to input 163. The other input to AND gate 62 is OR-tied to AND gates 63 and 64 which are alternatively high during each cycle time in the absence of any operations initiated from the keyboard. Two other storage registers are provided to facilitate data manipulation. Register M5 is one word long and is used to delay the stack information for shifting the stack down. Register M4 is also one word long and is used for auxiliary data storage. In the following paragraphs the basic calculator operations will be described using signals from the circuits shown in FIGS. 2, 3, 4 and 5 which will subsequently be described.

A first digit from the keyboard is entered in the following manner. The F7 input to AND gate 67 determines whether the data in KB may be cleared for a new entry or whether the stack must be first pushed down. If the data may be cleared, F7 will be low; if not, F7 would be high and the stack would be pushed down with the entry of a first digit from the keyboard. The F5 input to AND gate 69 tells whether a data entry is a first digit or not. If the entry is a first digit, F5 will be high and the data in KB will be cleared since gate 69 will cause AND gate 62 to close during W1 and thus prevent the data in KB from continuing on line 160. The digit information coming from the keyboard on the keylines is placed on line 160 through AND gate 74. AND gate 73 enables gate 74 at the appropriate time in response to digit position timing signals from FIG. 5. Successive digits are similarly entered via gates 73 and 74 and since the first digit has already been entered, F5 and F7 will be low, allowing the memory information to circulate normally around the loop.

Once data has been entered into KB, the stack can be pushed down in response to an enter signal ENT′, to permit further data entries. ENT′ opens AND gate 89 via OR gate 77 and AND gate 189 during W1, W2 and W3 to allow KB, M1 and M2 to pass through the one-word length delay memory M5. During W2, W3 and W4 gate 62 is closed by AND gate 63, thus prohibiting M1, M2 and M3 from getting through. The result of this operation is to duplicate the contents of KB into M1 and move the contents of M1 and M2 to M2 and M3 respectively. The contents of M3 are lost in the process of pushing down the stack.

In this embodiment each memory word is 16 digit positions long, with the first digit position giving the algebraic sign of the numerical information contained in the remaining 15 digit positions. The first digit position of a memory register normally contains a zero, representing a positive sign, and that digit is complemented if the numerical information is to have a negative sign. The F8 signal indicates that a change sign, signal CHS′, has been received from the keyboard and that the sign digit has been complemented. The complementing is done by inverter 82 when AND gate 78 is opened in response to the CHS′ signal and the change sign digit position signal $d_s$ and W1 in AND gate 98. When the complementing is being done, the normal data path is closed by gate 62 in response to AND gates 64, 72, and 80 and inverter 79. The sign digit may be changed at any time during numerical digit entry, as well as before and after, and may also be changed back and forth between positive and negative.

The results of any arithmetic or information handling operation are put in KB and a CHS' signal will change the sign of those results as described above. If the next signal is a digit F5 and F7 will be high, indicating that the stack must be pushed down to make way for a first digit. The F8 signal will also be high because of the CHS' signal and the first digit of KB will pass through inverter 82 to memory M5 via AND gate 81, the rest of KB as well as M1 and M2 passing through AND gate 89 to M5. M5 effects the push down of the stack by delaying the data in each memory position by one-word time to make room for new information in KB. During the time KB is passing through M5, gate 62 is closed to break the normal data path. The result of this operation is to change the sign of the result stored in KB back to its original value before pushing down the stack and to make the sign of the new information negative. In this process gate 81 responds to F7, F8, W1 and the sign digit position signal through AND gate 68. Likewise, gate 89 responds to F7, F8 and the complement of the sign digit position signal through OR gates 167, 76, and 77 and AND gates 168, 67 and 189.

Information can be stored in an auxiliary memory M4 that has its own data loop 260. When a store signal STO' is received by AND gate 86, AND gate 85 is opened during W1 to allow KB information to enter M4. At the same time AND gate 87 is closed, thus clearing the previously stored information. The normal data loop is not disturbed during this operation. The stored information can be recalled by a recall signal RCL' which opens AND gate 75 during W1 and closes gate 62, thus putting the information in the KB position. During the same time gate 89 is opened to pass KB, M1 and M2 through M5 in order to push down the stack. To accomplish that operation gate 89 responds to RCL' through gate 76 and F7 through gate 67 as well as gate 189; and gate 62 responds to RCL' through inverter 179 and gates 71 and 64.

The contents of KB and M1 will be added together in ADDER 90 in response to an add signal, ADD', from the keyboard. The details of ADDER 90 will not be shown since they are well known as disclosed, for example, by Rathbun and by Ivan Flores, Computer Logic, Chapter 10 (1960). In order to make M1 available simultaneously with KB, a one-word time early tap 164 is provided on memory 61. During W1, gate 62 is closed and AND gate 92 is opened to pass KB into ADDER 90. At the same time AND gate 94 is opened by AND gate 96 to pass M1 into ADDER 90, where the contents of KB and M1 are combined and put on line 160. During W2 and W3 gate 92 is closed, but gate 94 is left open, pushing up the contents of M3 and M2 to M2 and M1 respectively. During W4 gate 94 is closed and gate 62 is reopened, leaving the contents of M3 unchanged so that M3 and M2 then contain the same data. Alternatively, one could connect the ADDER to output 162 and to M5, which would put the result of the addition in M1, and then on the next cycle the stack could be pushed up.

Figure 2:
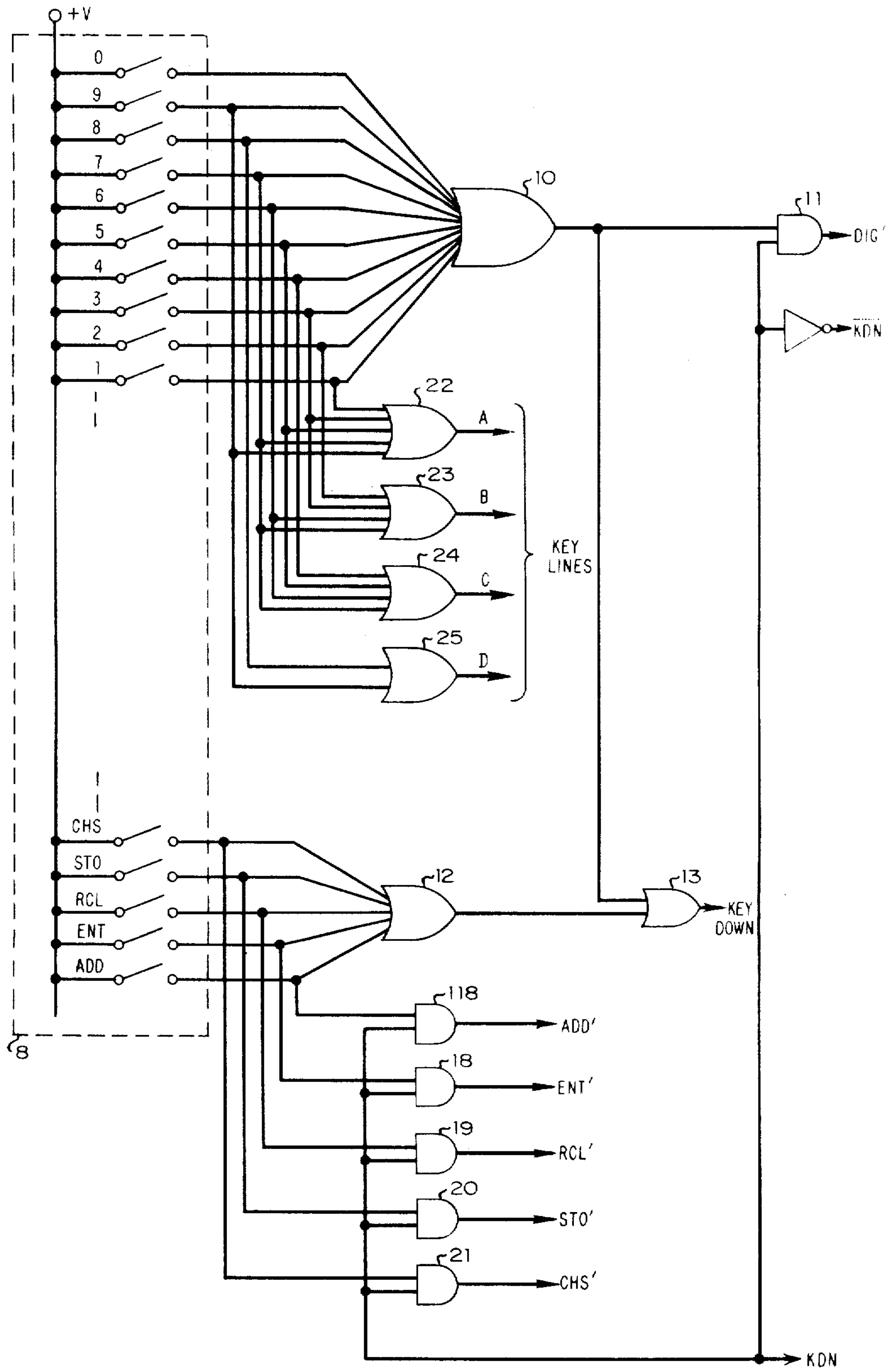
FIG. 2 shows the keyboard encoder logic.

These operations are preferred in response to various signals generated in response to the actuation of keys on the keyboard. The keyboard encoding circuitry is shown in FIG. 2. Keyboard 8 is a collection of momentary SPST switches connected to a voltage source V+ and each key actuation gives a logically high signal on the key output line. Each digit key is connected to an OR gate 10 as well as to decoding circuitry comprising OR gates 22, 23, 24, and 25 which encode the numbers in BCD (Binary Coded Decimal). The function keys are all connected to an OR gate 12. Gates 10 and 12 are in turn connected to an OR gate 13 which provides a keydown signal.

Figure 3:
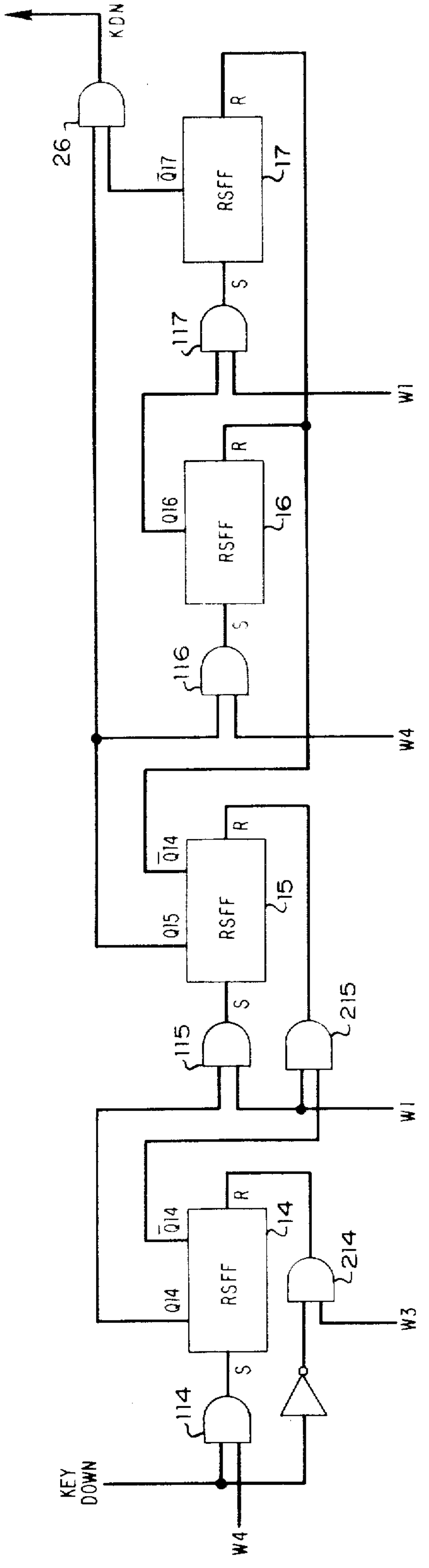
FIG. 3 shows the keyboard interlock logic.

FIG. 3 shows four flip flops 14, 15, 16 and 17 that are connected as an interlock to give a keydown signal KDN during just one machine cycle comprising 4 word times. The interlock operation can be simply illustrated by first assuming the Q output of each flip flop is low when a keydown signal occurs. Flip flops 14 and 15 are connected as a master and slave so that during W4 flip flop 14 is set, making $Q_{14}$ high, during W1 that signal is transferred to flip flop 15. Since $Q_{15}$ and $Q_{17}$ are both high they cause AND gate 26 to be high, giving the KDN signal starting with the first W1 after a key is actuated. Flip flops 16 and 17 are also a master-slave pair so that during W4 flip flop 16 is set, and the $Q_{16}$ signal is transferred to flip flop 17 during W1, making $\bar{Q}_{17}$ low and thus terminating KDN. When the key is released, the keydown signal is removed and the interlock is reset via AND gates 214 and 215. No matter how long a key is depressed, KDN will remain on for only four word times, starting with W1.

The KDN signal is used to produce several synchronous signals indicating that a certain key or one of a class of keys has been actuated. In FIG. 2 KDN is AND'ed with the output of gate 10 in AND gate 11 to produce DIG' which indicates that a digit key has been actuated. DIG' is used to signal the circuitry in FIG. 1 to enter a digit into KB. KDN is also AND'ed with each of the function keys "add" (ADD), "enter" (ENT), "recall" (RCL), "store" (STO) and "change sign" (CHS) in AND gates 118, 18, 19, 20, and 21 respectively to produce ADD', ENT', RCL', STO' and CHS' also used in connection with the circuits in FIG. 1 and FIG. 4.

Figure 4:
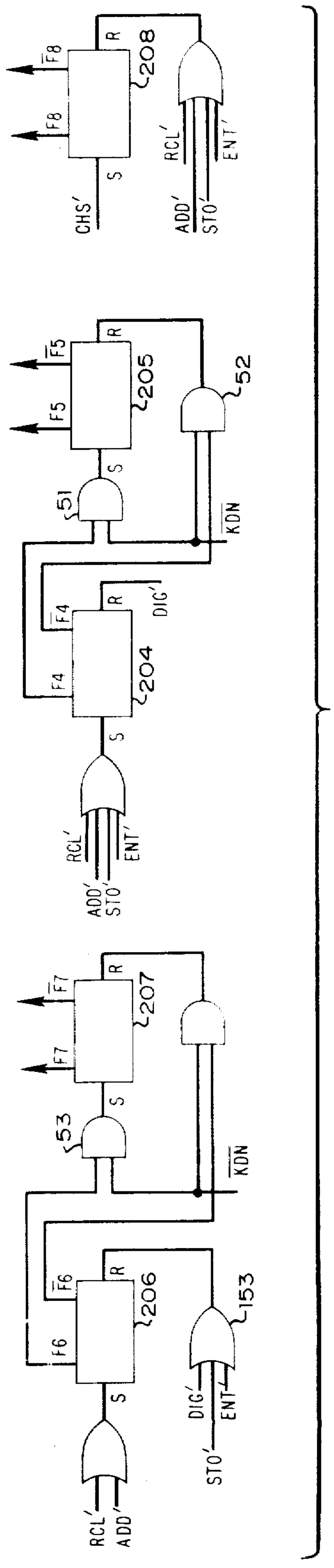
FIG. 4 shows the control flip flops.

Several control flip flops are shown in FIG. 4. Stack control flip flops 206 and 207 are arranged as a master-slave stack control flip flop. As will be recalled from the discussion of FIG. 1, the stack must be pushed down when a data entry occurs after a recall or an add operation, so RCL' and ADD' are connected to the set input of flip flop 206. After the RCL or ADD key is released, the F6 signal is transferred to flip flop 207 to make F7 high. Similarly DIG', STO', and ENT' are connected to the reset input of flip flop 206 through an OR gate 153 since they do not call for lowering the stack. After STO, ENT or a digit key is released, $\bar{F}7$ is therefore high. Flip flops 204 and 205 are connected as a master-slave pair to indicate a first digit entry. ADD', RCL', STO' and ENT' all set flip flop 204 to make F5 high after the respective key is released. DIG' resets flip flop 204 and causes F5 to be high after the digit key is released. Flip flop 208 is the change sign flip flop which is set to make F8 high whenever CHS' occurs and reset whenever RCL', STO', ADD' or ENT' occur.

Figure 5:
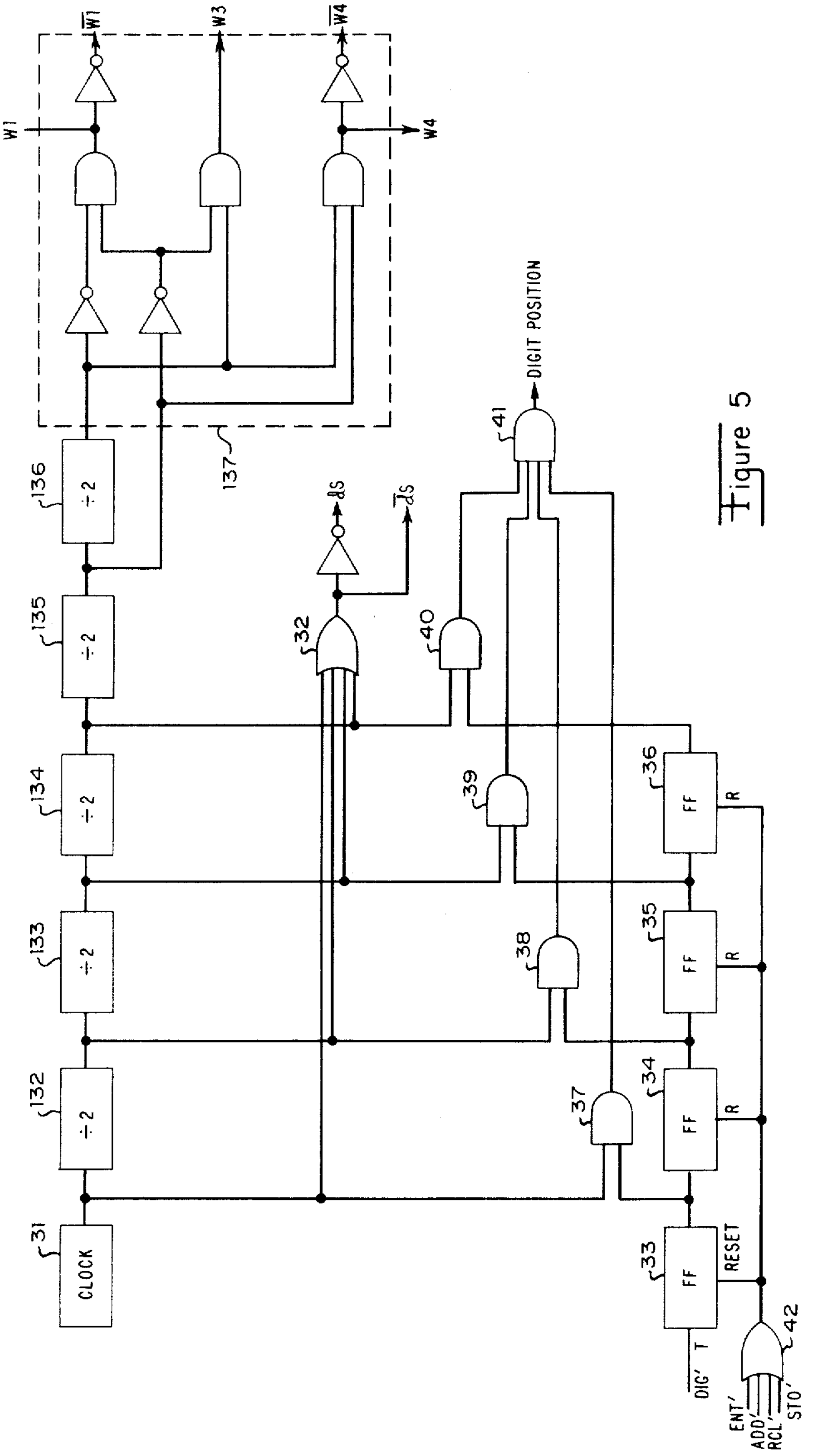
FIG. 5 shows the timing logic.

FIG. 5 shows the timing logic that produces the word time signals and the digit position signals. A master clock 31 provides all of the basic timing signals for the circuitry in FIGS. 1 and 3. The clock signal is divided down by a string of dividers 132 through 136. Each clock pulse corresponds to a digit and the last two divider outputs are decoded in decoder 137 to produce the word time signals. An OR gate 32 is used to decode the first digit position $d_s$ which corresponds to the sign digit. Flip flops 33 through 36 comprise a digit position counter which keeps track of how many digits have been entered into KB. The counter indexes one digit for each DIG' signal and is reset by ADD', ENT', RCL' or STO'. AND gates 37 through 40 connected to AND gate 41 test for coincidence between the timing signal from the clock and divider chain and the position count from the digit position counter. The DIGIT POSITION signal tells the circuitry in FIG. 1 when to insert a digit code from the key lines onto line 160.

Although the structure and operation of the calculator have been described in terms of flip flops and gates, it will be appreciated by one skilled in the art that the calculator could also be implemented using other types of circuit elements such as read only memories (ROM). Thus the logical equations embodied herein in gates and flip flops would be realized in connections between sense and readout lines of a ROM. It will also be appreciated that other arithmetic operations besides add could be used in the calculator - add was simply shown as illustrative of the interaction between arithmetic functions and data handling functions.

We claim:

1. In an electronic calculator including a stack memory for storing a stack of data words, shifting means for pushing the words in the stack up and down, digit keys for inputting data into the top word in the stack, and an enter key, the improvement comprising:

control means connected to the enter key and the shifting means for pushing down the stack and leaving the word in the top of the stack unchanged in response to actuation of the enter key.

2. In an electronic calculator as in claim 1, the further improvement comprising clearing means connected to the stack memory and the digit keys for clearing the top of the stack word in response to the actuation of a digit key subsequent to the actuation of the enter key.

3. In an electronic calculator as in claim 2 including function keys, the further improvement comprising function means connected to the stack memory and the function keys for combining the word in the top of the stack with the word in the next memory position, entering the result of the combination into the top of the stack and pushing up the rest of the words in the stack in response to the actuation of a function key subsequent to the actuation of the enter key.

4. In an electronic calculator as in claim 3 the further improvement comprising logic means connected to the shifting means and the function means for pushing the stack down in response to the actuation of a data key subsequent to the actuation of a function key.

5. In an electronic calculator as in claim 2 including function keys, the further improvement comprising function means connected to the stack memory and the function keys for combining the word in the top of the stack with the word in the next memory position, entering the result of the combination into said next memory position and pushing up the words in the stack in response to the actuation of a function key subsequent to the actuation of the enter key.

6. In an electronic calculator as in claim 5, the further improvement comprising logic means connected to the shifting means and the function means for pushing the stack down in response to the actuation of a data key subsequent to the actuation of a function key.

7. In an electronic calculator including a stack memory for storing data words, each word including information representing the algebraic sign of the word comprising at least one bit, digit keys for inputting data into the top word in the stack, and shifting means for pushing the words in the stack up and down, the improvement comprising:

a change sign key;

complementing means connected to the stack memory for complementing the sign information in the word in the top of the stack in response to actuation of the change sign key; and control means connected to the complementing means and the digit keys for recomplementing the sign information in the word shifted from the top of the stack to the next memory position in response to the actuation of a data key after the actuation of the change sign key and for complementing the sign information in the word containing data inputted into the stack memory in response to said actuation of a data key.

8. In an electronic calculator as in claim 7 including function keys, the further improvement comprising:

logic means connected to the function keys and the control means for presetting the control means to respond to the actuation of a data key after the actuation of the change sign key.

9. In an electronic calculator including a stack memory for storing a stack of data words, shifting means for pushing the words in the stack up and down, digit keys for inputting data into the top word in the stack, an auxiliary memory, and a store key, the improvement comprising:

control means connected to the store key, the stack memory and the auxiliary memory for duplicating the word in the top of the stack into the auxiliary memory, leaving the word in the top of the stack unchanged, in response to actuation of the store key.

10. In an electronic calculator as in claim 9, the further improvement comprising clearing means connected to the stack memory and the digit keys for clearing the top of the stack word in response to the actuation of a digit key subsequent to the actuation of the store key.

11. In an electronic calculator as in claim 10 including function keys, the further improvement comprising function means connected to the stack memory and the function keys for combining the word in the top of the stack with the word in the next memory position, entering the result of the combination into the top of the stack and pushing up the rest of the words in the stack in response to the actuation of a function key subsequent to the actuation of the store key.

12. In an electronic calculator as in claim 11 the further improvement comprising logic means connected to the shifting means and the function means for pushing the stack down in response to the actuation of a data key subsequent to the actuation of a function key.

13. In an electronic calculator as in claim 10 including function keys, the further improvement comprising function means connected to the stack memory and the function keys for combining the word in the top of the stack with the word in the next memory position, entering the result of the combination into said next memory position and pushing up the words in the stack in response to the actuation of a function key subsequent to the actuation of the enter key.

14. In an electronic calculator as in claim 13 the further improvement comprising logic means connected to the shifting means and the function means for pushing the stack down in response to the actuation of a data key subsequent to the actuation of a function key.

* * * * *